US006713584B1

(12) United States Patent
Chisholm et al.

(10) Patent No.: US 6,713,584 B1
(45) Date of Patent: Mar. 30, 2004

(54) POLYMER COMPOSITION

(75) Inventors: Michael Stephen Chisholm, Cleveland (GB); Andrew Trevithick Slark, North Yorkshire (GB)

(73) Assignee: Lucite International UK Limited, Southampton (GB)

( * ) Notice: Subject to any disclaimer, the term of this patent is extended or adjusted under 35 U.S.C. 154(b) by 0 days.

(21) Appl. No.: 09/623,860

(22) PCT Filed: Mar. 12, 1999

(86) PCT No.: PCT/GB99/00618

§ 371 (c)(1),
(2), (4) Date: Nov. 13, 2000

(87) PCT Pub. No.: WO99/46310

PCT Pub. Date: Sep. 16, 1999

(30) Foreign Application Priority Data

Mar. 12, 1998 (GB) ............................................. 9805141
Aug. 15, 1998 (GB) ............................................. 9817728

(51) Int. Cl.$^7$ ............................................. C08F 120/18
(52) U.S. Cl. ................... 526/329.7; 526/79; 526/307.7; 526/318.4; 526/332; 526/342; 526/347; 526/265; 526/271; 526/273
(58) Field of Search ................................ 526/329.7, 79, 526/307.7, 318.4, 332, 342, 347, 265, 271, 273

(56) References Cited

U.S. PATENT DOCUMENTS

| | | | |
|---|---|---|---|
| 4,839,448 A | 6/1989 | Jung et al. | |
| 4,880,889 A | 11/1989 | Jung et al. | |
| 4,988,760 A | 1/1991 | Jung et al. | |
| 5,026,807 A * | 6/1991 | Ohira et al. | 526/321 |
| 5,115,064 A | 5/1992 | Jung et al. | |
| 5,166,259 A * | 11/1992 | Schmeing et al. | 524/814 |
| 5,227,432 A | 7/1993 | Jung | |
| 5,714,261 A | 2/1998 | Siol et al. | 428/402 |
| 5,726,268 A | 3/1998 | Sakamoto | |
| 5,767,211 A | 6/1998 | Guan | |
| 5,889,116 A * | 3/1999 | Suzuki et al. | 525/209 |
| 6,235,857 B1 * | 5/2001 | Rizzardo et al. | 526/220 |

FOREIGN PATENT DOCUMENTS

| | | |
|---|---|---|
| BE | 628194 | 5/1963 |
| EP | 103 199 | 3/1988 |
| EP | 0718 326 | 6/1996 |
| GB | 2 294 467 | 5/1996 |
| WO | WO 98/27121 | 6/1998 |

* cited by examiner

Primary Examiner—Tatyana Zalukaeva
(74) Attorney, Agent, or Firm—Pillsbury Winthrop LLP

(57) ABSTRACT

A method of preparing a (meth)acrylate functionalised polymer comprising the steps of mixing together a monofunctional vinylic monomer with from 0.3–100% w/w (based on monofunctional monomer) of a polyfunctional vinylic monomer and from 0.0001–50% w/w of a chain transfer agent, reacting said mixture to form a polymer and terminating the polymerisation reaction before 99% conversion. The resulting polymers are useful as components of surface coatings and inks, as moulding resins or in curable compounds, e.g. curable moulding resins or photoresists.

19 Claims, No Drawings

POLYMER COMPOSITION

This application is the national phase of international application PCT/GB99/00618 filed Mar. 12, 1999 which designated the U.S.

The present invention relates to a polymer composition, in particular to a branched polymer which has polymerisable double bonds and to a method of preparation therefor.

Branched polymers are polymer molecules of a finite size which are branched, often having many branches. Branched polymers differ from crosslinked polymer networks which tend towards an infinite size having interconnected molecules and which are generally not soluble. Branched polymers are usually soluble in solvents which dissolve analogous linear polymers but have the advantage that solutions of branched polymers are usually less viscous than solutions of the same concentration of the corresponding linear polymer having a similar molecular weight. Therefore solutions of branched polymers are easier to handle especially at high solids content and may be made using less solvent than solutions of linear polymers. For this reason, branched polymers are useful additives to solvent-based coatings and inks, for example and they also have many other applications. Additionally, branched polymers also have a lower melt viscosity than analogous linear polymers and are useful for improving melt processability in injection moulding, compression moulding, extrusion moulding or powder coatings.

Branched polymers may be made by a two-step process in which a linear polymer containing branching sites is subjected to a further polymerisation or modification step to form branches from the branching sites. The inherent complications of a two-step process may be unattractive and make the resulting branched polymer expensive to use. Alternatively a one-step process can be used in which a polyfunctional monomer is present to provide functionality in the polymer chain from which polymer branches may grow. However, a limitation on the use of conventional one-step processes is that the amount of polyfunctional monomer must be carefully controlled, usually to substantially less than about 0.5% w/w in order to avoid extensive cross-linking of the polymer and the formation of insoluble gels. It is very unusual to avoid crosslinking using this system, especially in the absence of a solvent as diluent and/or at high conversion of monomer to polymer.

Polymers having residual polymerisable double bonds are also conventionally made by two-step processes because using conventional polymerisation processes, polymerisable groups in the polymer would polymerise to form cross-linked polymer molecules. Typically polymerisable double bonds may be added to a functional polymer backbone by post-polymerisation reaction of the functional groups with a compound which carries such a double bond. These two-step process have the disadvantages of increased complexity and therefore cost compared to simple polymer preparation methods.

GB-A-2294467 describes a branched polymethyl-methacrylate polymer which has a molecular weight of 80,000–400,000 in which the molecular weight between the branching points is between 30,000 and 1,000,000 which includes 0.05–0.2% of a polyfunctional monomer and <0.5 mole % of a chain transfer agent. U.S. Pat. No. 5,767,211, published Jun. 16, 1998, describes the synthesis of multi-functional hyperbranched polymers by free-radical polymerisation of di- or tri-vinyl monomers in the presence of a chain transfer catalyst and a non-peroxide free radical initiator. The resulting polymers are oily, low Tg materials.

EP-A-103199 describes copolymers of t-butyl acrylate with 0.1–3% polyfunctional acrylate and 1–30% of functional comonomer made by solution polymerisation in the presence of a chain transfer agent. The functional comonomer provides an active cross-linking site used to form a coating composition crosslinked by condensation chemistry.

U.S. Pat. No. 4,880,889 describes a pre-crosslinked soluble polymer containing 10–60% of OH-functionalised monomer, 5–25% of a monomer with at least 2 olefinically unsaturated double bonds and 15–82% of further monofunctional monomers. The polymer composition is made by a solution polymerisation process in organic solvent at a low polymerised solids content of about 50% in order to produce an ungelled copolymer, using >0.5% of a polymerisation regulator. The polymers are used in crosslinked coatings where the OH group is reacted with melamine-formaldehyde crosslinkers. U.S. Pat. No. 4,988,760 and U.S. Pat. No. 5,115,064 define similar compositions which include functionalised monomers having different cross-linkable groups which include carboxyl and isocyanate.

U.S. Pat. No. 5,227,432 describes a process for making acrylate copolymers with free double bonds in which an acrylate copolymer made by polymerising a monomer mixture containing 5–60% of functionalised monomer, 3–30% of a monomer with at least 2 olefinically unsaturated double bonds and other monofunctional monomers is reacted in a subsequent stage with a compound having a functional group which can react with the functional group of the polymer and which also has at least one ethylinically unsaturated polymerisable double bond. This is a two stage process, in that the polymer with functional group is made in a first stage and then compound which includes the ethylenically unsaturated double bond is reacted with the functional group in e.g. an esterification reaction.

WO 98/27121 describes an acrylate-functionalised acrylate copolymer made by a two-stage process of forming a copolymer having an esterifiable functional group and subsequently esterifying the functional group with a compound having a polymerisable acrylate or methacrylate group, the esterification reaction being carried out in the presence of a carbodiimide compound.

There is therefore a need for a method of forming acrylate or methacrylate functionalised polymers in a relatively simple way.

According to the invention we therefore provide a method of preparing a polymer which includes at least one polymerisable double bond comprising:

(i) mixing together a monofunctional monomer having one polymerisable double bond per molecule with from 0.3–100% w/w (of the weight of the monofunctional monomer) of a polyfunctional monomer having at least two polymerisable double bonds per molecule and from 0.0001–50% w/w (of the weight of the monofunctional monomer) of a chain transfer agent and optionally a free-radical polymerisation initiator, (ii) reacting said mixture to form a polymer, (iii) terminating the polymerisation reaction when <99% of the polymerisable (double bonds present in the mixture have reacted to form polymer.

In a second aspect of the invention, we provide a polymer which includes at least one polymerisable double bond consisting of residues of:

i) a monofunctional monomer having one polymerisable double bond per molecule, ii) 0.3–100% w/w (of the weight of the monofunctional monomer) of a polyfunctional monomer having at least two polymerisable double bonds per molecule;

iii) from 0.0001–50% w/w (of the weight of the monofunctional monomer) of a chain transfer agent and optionally iv) a free-radical polymerisation initiator.

Such a polymer therefore does not contain residues of a post-polymerisation functionalisation reaction which is necessitated, for example, by preparing an acrylate-functionalised polymer by the two-stage processes of the prior art. However, when a (meth)acrylate functionalised polymer is prepared by the method of the present invention using a monomer which has a functional pendant group, e.g. OH, carboxyl or amine, then the polymer may be subjected to post-polymerisation reactions of that functional group if required.

By (meth)acrylate, we mean either methacrylate, acrylate or both types of group.

All amounts in weight % are calculated based on the total weight of monofunctional monomer. For example, if 100 g of monofunctional monomer (which may be a mixture of different monofunctional monomers) is used, 5% wt of polyfunctional monomer is 5 g on this basis.

For simplicity, a monomer having one polymerisable double bond per molecule will be referred to hereinafter as a monofunctional monomer (MFM) and a monomer having at least two polymerisable double bonds per molecule will be referred to as a polyfunctional monomer (PFM). By polymer which includes at least one polymerisable double bond we mean a polymer having a double bond which can take part in further polymerisation reactions after it has been made. The polymersiable double bond may be pendant or terminal but preferably the polymer includes at least one polymerisable double bond in a pendant group. The polymer which includes at least one polymerisable double bond may be referred to hereinafter as a polymerisable polymer.

The monofunctional monomer may comprise any monomer which can be polymerised by a free-radical mechanism such as methacrylates and acrylates, styrene and derivatives thereof (styrenics), vinyl acetate, maleic anhydride, itaconic acid, N-alkyl (aryl) maleimides and N-vinyl pyrrolidone, vinyl pyridine, acrylamide, methacrylamide, N,N-dialkylmethacrylamides and acrylonitrile. Mixtures of more than one monofunctional monomer may be used to produce a random, alternating block or graft copolymer. Preferred monofunctional monomers comprise acrylates and methacrylates, i.e. preferably the double bond is a vinylic double bond of an acrylate methacrylate compound.

Examples of suitable monofunctional (meth)acrylate monomers include lower alkyl, i.e. $C_1$ to $C_{20}$ alkyl, (meth)acrylates, e.g. methyl (meth)acrylate, ethyl (meth)acrylate, propyl (meth)acrylate, n-butyl (meth)acrylate, iso-butyl (meth)acrylate, t-butyl (meth)acrylate, 2-ethyl hexyl (meth)acrylate, octyl (meth)acrylate or dodecyl (meth)acrylate. Additionally, cyclic alkyl monomeric species may be used such as cyclohexyl (meth)acrylate, isobornyl (meth)acrylate and dicyclopentenyl (meth)acrylate. Functional monomers such as methacrylic acid and acrylic acid, hydroxy alkyl methacrylates such as hydroxy ethyl (meth)acrylate, hydroxypropyl (meth)acrylate and hydroxybutyl (meth)acrylate, glycidyl (meth)acrylate, dialkyl aminoalkyl (meth)acrylates such as dimethyl aminoethyl (meth)acrylate, diethyl aminoethyl (meth)acrylate, dimethyl aminopropyl (meth)acrylate and diethyl aminopropyl (meth)acrylate. By (meth)acrylate, we mean that either the methacrylate or the analogous acrylate may be used.

By polyfunctional monomer, we mean a monomer which has at least two polymerisable double bonds per molecule. We also include in the term polyfunctional monomer reactive oligomers or reactive polymers or pre-polymers having at least two double bonds polymerisable via a free-radical mechanism. Examples of suitable bifunctional monomers include: ethylene glycol di(meth)acrylate, hexanediol di(meth)acrylate, tripropylene glycol di(meth)acrylate, butanediol di(meth)acrylate, neopentyl glycol di(meth)acrylate, diethylene glycol di(meth)acrylate, triethylene glycol di(meth)acrylate, dipropylene glycol di(meth)acrylate, allyl (meth)acrylate, divinyl benzene and substituted analogues thereof. Trifunctional examples include: tripropylene glycol tri(meth)acrylate, trimethylol propane tri(meth)acrylate, pentaerythritol tri(meth)acrylate. Tetrafunctional monomers such as pentaerythritol tetra(meth)acrylate and hexafunctional monomers, e.g. dipentaerythritol hexa(meth)acrylate may also be used. Optionally, the polyfunctional monomer may comprise a mixture of more than one polyfunctional compound.

The polymerisable polymer may be formed using a reactive oligomer or reactive polymer or pre-polymer having at least two polymerisable double bonds per molecule as the or one of the polyfunctional monomers. We include such functional polymers and oligomers in the term "polyfunctional monomer" because the polymerisable double bonds, which are preferably (meth)acrylate groups enable the reactive oligomer or reactive polymer to polymerise into the growing polymer molecules in the same way as a simple polyfunctional monomer. Typical reactive oligomers include, but are not limited to, epoxy-(meth)acrylates, polyether (meth)acrylates, polyester-(meth)acrylates and urethane-(meth)acrylates. Typical reactive polymers include addition or condensation polymers such as a styrene or acrylic copolymers containing pendant polymerisable (meth)acrylate groups or unsaturated polyesters. The molecular weight range of the oligomer or reactive polymer may vary from 500–500,000 g/mole. When such reactive oligomers or polymers are used to provide at least a part of the polyfunctional monomers the amount of polyfunctional material included in the reaction process is normally much greater than when simple monomers are used, due to the higher molecular weight of such materials.

The amount of polyfunctional monomer present may be up to 100 wt % of the total initial monofunctional monomer concentration. Preferably, the amount of polyfunctional monomer present is 0.3–25%. e.g. 0.5–10% based on monofunctional monomer when the polyfunctional monomer is a simple monomer, i.e. not a reactive oligomer or polymer. When reactive polymers or oligomers are used then the concentration may vary up to about 50% w/w or greater.

The chain transfer agent may be chosen from a range of thiol compounds including monofunctional and polyfunctional thiols. Monofunctional thiols include propyl mercaptan, butyl mercaptan, hexyl mercaptan, octyl mercaptan, dodecyl mercaptan, thioglycollic acid, mercaptopropionic acid, alkyl thioglycollates such as 2-ethyl hexyl thioglycollate or octyl thioglycollate, mercaptoethanol, mercaptoundecanoic acid, thiolactic acid, thiobutyric acid. Polyfunctional thiols include trifunctional compounds such as trimethylol propane tris(3-mercaptopropionate), tetrafunctional compounds such as pentaerythritol tetra(3-mercaptopropionate), pentaerythritol tetrathioglycollate, pentaerythritol tetrathiolactate, pentaerythritol tetrathiobutyrate; hexafunctional compounds such as dipentaerythritol hexa(3-mercaptopropionate), dipentaerythritol hexathioglycollate; octafunctional thiols such as tripentaerythritol octa (3-mercaptopropionate), tripentaerythritol octathioglycollate. The use of polyfunctional thiols is a useful way to increase the degree of branching in the polymer. Optionally, the chain transfer agent may comprise a mixture of more than one type of compound.

The amount of chain transfer agent present may be up to 50 wt % of the total initial monofunctional monomer concentration. In a first embodiment, the amount of chain transfer agent present is 0.1–20% w/w, e.g. 0.5–10%w/w based on monofunctional monomer. The polymerisable polymer is made using an appropriate amount of chain transfer agent to prevent the formation of a substantial amount of insoluble cross-linked polymer. The majority of the polymer produced is soluble, even at high conversion of monomer to polymer. A small amount of cross-linked polymer may be formed but the reaction conditions and level of chain transfer agent should preferably be chosen such that the amount of cross-linked polymer formed is <10% (w/w), more preferably <5% (w/w), more preferably <2.5% (w/w) and optimally 0% (w/w). We have found that the use of secondary mercaptans as chain transfer agents leads to a reduction in the level of cross-linked polymer and reduces the formation of microgels in solutions of the resulting branched polymers. Therefore, for certain polymerisation systems, the use of secondary mercaptan chain transfer agents may be preferred. Chain transfer agents comprising secondary mercaptans are particularly preferred when the polymerisation is carried out in bulk or suspension polymerisation processes.

Alternative chain transfer agents may be any species known to reduce molecular weight in the conventional free-radical polymerisation of vinyl monomers. Examples include sulphides, disulphides, halogen-containing species. Also, catalytic chain transfer agents such as cobalt complexes, e.g. cobalt (II) chelates such as cobalt porphyrin compounds are useful chain transfer agents for the invention. Suitable cobalt chelates are known in the art and are described in WO 98/04603. A particularly suitable compound is bis(borondifluorodimethylglyoximate) cobaltate (II) also known as COBF. Catalytic chain transfer agents may be used in relatively low concentrations compared to conventional thiol chain transfer agents, e.g. <0.5% preferably <0.1% by weight, since they are generally highly effective at low concentrations. We have surprisingly found that catalytic chain transfer compounds based on cobalt complexes may be very effectively used at concentrations of less than 0.05% (500 ppm) w, e.g. 0.0001–0.01%w (1–100 ppmw) based on monomer in the polymerisation process of the present invention to give soluble branched polymers.

The polymerisation of the monomers may be initiated by any suitable method of generating free-radicals such as by thermally induced decomposition of a thermal initiator such as an azo compound, peroxide or peroxyester. Therefore the polymerisation mixture also preferably contains a polymerisation initiator which may be any of those known and conventionally used in free-radical polymerisation reactions, e.g. azo initiators such as azobis(isobutyronitrile) (AIBN), azobis(2-methylbutyronitrile), azobis(2,4-dimethylvaleronitrile), azobis(4-cyanovaleric acid), peroxides such as dilauroyl peroxide, tert-butyl peroxyneodecanoate, dibenzoyl peroxide, cumyl peroxide, tert-butyl peroxy-2-ethyl hexanoate, tert-butyl peroxy diethyl acetate and tert-butyl peroxy benzoate.

The polymerisation of the monomer mixture may be performed using any free-radical polymerisation method, e.g. solution, suspension, emulsion and bulk polymerisation methods may all be used. For some applications of the polymerisable polymers of the invention, the material is required in solid form. For these applications, it may be advantageous to produce the polymer by a non-solution method, e.g. suspension or bulk polymerisation. Surprisingly a soluble acrylate-functionalised branched polymer may be successfully formed from polyfunctional monomers in a non-solution method because the formation of gels would be expected. For example, U.S. Pat. No. 4,880,889 teaches that special reaction conditions, including carrying out the polymerisation in solution at a relatively low solids content of about 50%, are required to obtain ungelled polymer.

Therefore in a further aspect of the invention, we provide a method of preparing a polymer which includes at least one polymerisable double bond comprising:

(i) mixing together a monofunctional monomer having one polymerisable double bond per molecule with from 0.3–100% w/w (of the weight of the monofunctional monomer) of a polyfunctional monomer having at least two polymerisable double bonds per molecule and from 0.0001–50% w/w (of the weight of the monofunctional monomer) of a chain transfer agent;

(ii) dispersing the resulting mixture as a discontinuous phase in a continuous phase in which the monomers are relatively insoluble in the presence of a dispersing agent which is capable of maintaining the mixture of monomers as a discontinuous phase in the continuous phase;

(iii) initiating polymerisation of the monomer mixture;

iii) maintaining the dispersion of monomer in continuous phase at a reaction temperature for sufficient time to enable the monomers to react to form a polymer;

iv) terminating the polymerisation reaction when <99% of the polymerisable (meth)acrylate groups present in the mixture have reacted to form polymer; and v) subsequently separating the dispersed phase containing the polymer from the continuous phase.

The polymerisable polymer preferably contains pendant (meth)acrylate groups. The continuous phase is normally water. Suitable dispersing agents are well known in the art and include modified cellulose polymers (e.g. hydroxy ethyl, hydroxy propyl, hydroxy propyl methyl), polyacrytic acid, polymethacrylic acid, partially and fully neutralised versions of these acids, poly(vinyl alcohol), poly(vinyl alcohol/vinyl acetate) copolymers amongst others. The dispersion of monomers in the continuous phase is normally agitated at high speed throughout the polymerisation process to help keep the dispersion stable and to enable good heat transfer between the continuous phase and the dispersed droplets or particles. As the polymerisation reaction proceeds, the monomers in the dispersed phase react to form polymer which remains within the dispersed phase. The reaction temperature may vary according to the type of monomers and initiator which is used and is typically between 20 and 150° C., for example in the range 50–120° C. Suitable reaction temperatures are well known in the art.

Bulk polymerisation methods may be used, although they are less preferred. Typically in a bulk polymerisation, the monomer mixture is placed in a sealed container, e.g. a bag, together with the initiator and chain transfer agent and heated to a suitable polymerisation temperature between 50 and 150° C. until the desired conversion has been achieved. Normally the temperature is varied throughout the reaction time to control the rate of polymerisation as the reaction proceeds. Such methods are known in the art to make acrylic polymers.

The polymerisation is terminated before completion, i.e. before 100% conversion and in this way polymerisable polymers, e.g. branched polymers which have acrylate functionality can be produced. Such polymers may then be further reacted, isolated and/or formulated into a curable composition and then reacted with other polymerisable or cross-linking species to form cured or cross-linked polymeric materials. Preferably the polymerisation reaction is terminated at a conversion of 80–98%, more preferably 85–97%.

The polymerisation reaction may be terminated by cooling the reaction mixture or by adding a polymerisation inhibitor to the reaction mixture before the monomer has been completely converted to polymer. Suitable inhibitors include (optionally substituted) hydroquinones, e.g. methyl hydroquinone or other species known to have an inhibiting effect on vinylic polymerisations such as t-butyl catechol, substituted phenolics, e.g. 2,6-t-butyl(4-nonylphenol), phenothiazine and substituted analogues.

Alternatively the polymerisation may be terminated before complete conversion of monomer by selecting a combination of initiator type, initiator concentration, polymerisation temperature and polymerisation time such that the initiator is used up, i.e. the availability of free radicals to initiate polymerisation becomes less and stops, before all of the available monomer has been polymerised. Therefore the polymerisation reaction is initiated using a combination of initiator type, initiator concentration, polymerisation temperature and polymerisation time such that the availability of free radicals to initiate polymerisation is insufficient to convert all polymerisable groups in the monomer mixture to polymer.

In conventional polymensation reactions initiators are chosen to ensure that sufficient free-radicals are available to react the monomer to complete conversion in an appropriate time. Sometimes a mixture of initiators is selected to provide desired polymerisation rates. The activity of thermal initiators is often measured and specified as the 10-hour half-life temperature. Thermal initiators are chosen to have an appropriate half-life at the temperature of polymerisation. A preferred approach in the method of this invention is to select an initiator or a combination of initiators which has a relatively short half-life at the polymerisation temperature. The selection of short half-life or "fast" initiators is well known in the art.

The half life ($t_{1/2}$) of a thermal initiator is the time required to reduce the original initiator content at a given temperature to 50% and may be determined by differential scanning calorimetry of dilute solutions of the initiator in monochlorobenzene. Initiator half lives and 10-hour half-life temperatures are usually readily available from manufacturers' literature, e.g. "Initiators for Polymer Production—Product Catalog" from Akzo Nobel. AIBN has a 10-hour half-life temperature of 64° C.

AIBN is suitable for producing high conversion of (meth)acrylate monomers to acrylic polymers at a polymerisation temperature of 75° C. At this polymerisation temperature, a faster initiator which has a 10-hour half-life temperature of less than 64° C. is preferred for the method of the invention. Suitable fast initiators include 2,2'-azobis(2,4-dimethylvaleronitrile) which has a 10-hour half-life temperature of 52° C. and t-butylperoxyneodecanoate which has a 10-hour half-life temperature of 46° C.

Alternatively the amount of initiator may be selected to be insufficient to effect complete conversion of the monomers at the polymerisation temperature.

The polymerisable e.g. (meth)acrylate-functionalised polymers of the invention are useful as components of a number of surface coatings compositions including paints, clear varnishes, inks and adhesives. They may be particularly useful as components in radiation-curable formulations in which the coating constituents, including the polymerisable polymer, are dissolved or dispersed in a polymerisable liquid which polymerises in the presence of radiation (such as UV, light, electron-beam, infra-red or heat). Such coatings may also cross-link or polymerise over a relatively longer period of time in the absence of radiation. Curing or cross-linking of the polymerisable polymers within a coating may impart superior solvent resistance, hardness and resistance to shrinkage. Coatings containing such polymers may also show improved adhesion and faster drying or curing speeds. The polymerisable polymers made by the method of the invention are branched in nature and this property may improve solubility in monomers or solvents compared to comparable linear polymers. For application in such coating formulations, the polymerisable, e.g. (meth)acrylate-functionalised polymer may be supplied without removing residual monomer (if any) from the polymerisation process because the residual monomer may be the same as or compatible with a polymerisable liquid forming a constituent of the coating formulation. For example, when a (meth) acrylate-functionalised polymer is made using MMA as a monofunctional monomer, the resulting polymer, containing some unreacted MMA, is suitable for use in a coating formulation based on MMA without removal of residual monomer.

The functional polymers are also useful in coatings applications such as powder coatings and hot-melt adhesives (conventional and radiation-cured) which do not require the use of a diluent. In addition to surface coatings applications, the branched polymers of the invention are useful for the preparation of bulk polymer articles via injection moulding, compression moulding or extrusion moulding. The polymerisable polymers may also be used as constituents of compositions for use in other applications in which acrylic polymers are cured in situ, e.g. in polymer-in-monomer syrups for reactive flooring, filled moulding compositions for moulding of e.g. kitchen sinks, worktops, acrylic sheets, shower trays, curable cements, photoresists, adhesives (including pressure-sensitive adhesives) etc. The polymerisable branched copolymers of the invention may be used alone or blended with other polymers in the end-use application.

In another aspect of the invention we provide a surface coating composition comprising a branched polymerisable polymer which comprises residues of a polymer which includes at least one polymerisable (meth)acrylate group, said polymer consisting of residues of:

i) a monomer having one polymerisable (meth)acrylate group per molecule, ii) 0.3–100% w/w (of the weight of the monomer having one polymerisable (meth)acrylate group per molecule) of a monomer having at least two polymerisable (meth) acrylate groups per molecule;

iii) from 0.0001–50% w/w (of the weight of the monomer having one polymerisable (meth)acrylate group per molecule) of a chain transfer agent and optionally iv) a free-radical polymerisation initiator.

The surface coating composition typically also may include polymerisable species such as monomers, functionalised oligomers and copolymers and other compounds such as cross-linking species, polymers, curing agents, colourants, solvents, dispersing aids, lubricants, processing aids, fillers, carrier fluids and toughening agents, plasticisers, flexibilisers, stabilisers, perfumes and other components as appropriate.

In a further aspect of the invention, we provide a polymeric article or coating comprising 1) a branched polymerisable polymer consisting of residues of:
   i) a monomer having one polymerisable (meth)acrylate group per molecule,
   ii) 0.3–100% w/w (of the weight of the monomer having one polymerisable (meth)acrylate group per molecule) of a monomer having at least two polymerisable (meth)acrylate groups per molecule;
   iii) from 0.0001–50% w/w (of the weight of the monomer having one polymerisable (meth)acrylate group per molecule) of a chain transfer agent and optionally
   iv) a free-radical polymerisation initiator and optionally
2) other compounds selected from monomers, functionalised oligomers and copolymers and other compounds such as cross-linking species, polymers, curing agents, colourants, solvents, dispersing aids, lubricants, processing aids, fillers, carrier fluids and toughening agents, plasticisers, flexibilisers, stabilisers and perfumes.

The weight average molecular weight (Mw) of the acrylate-functionalised branched polymer is preferably in the range 2,000–500,000. For certain applications, e.g. where dissolution of the branched polymer is required, a lower molecular weight, e.g. in the range 2,000–200,000 may be preferred.

The invention will now be further described with reference to the following Examples. In all examples, MFM refers to monofunctional monomer, PFM to polyfunctional monomer and CTA to chain transfer agent. The quantities of materials used in the polymerisations are calculated as w/w with respect to the total concentration of monofunctional monomer. The weights of polyfunctional monomer, chain transfer agent and initiator used, described as a weight % is calculated as a percentage of the weight of total monofunctional monomer. For example, for a polymerisation of MFM involving 3% PFM and 4% CTA, 3g of PFM and 4g of CTA would be added to 100 g of MFM.

Preparation of Polymers by Suspension Polymerisation

Polymers were prepared by suspension polymerisation of a monomer mixture containing monofunctional and polyfunctional monomers in the presence of the chain transfer agent, e.g. dodecyl mercaptan (DDM), a dispersant (hydroxy ethyl cellulose, 1–2% by weight on monomer) and a free-radical initiator (AIBN, 1% by weight on monomer) in deionised water. In a typical preparation. 2000 ml deionised water and about 4 g hydroxy ethyl cellulose (HEC) were added to a 5000 ml baffled flask. Nitrogen was purged through the water for 30 minutes to remove dissolved oxygen and the flask was agitated with a stainless steel stirrer set at 1400 rpm. The CTA was dissolved into the monomer mixture (500 g of the MFM mixed with the required amount of PFM), and then added to the reaction flask followed by the AIBN. The reaction flask was heated at full power to 75° C. and then the heating was reduced. The reaction was allowed to proceed until the exotherm began to subside. The maximum polymerisation temperature was typically 90° C. The flask was left to heat treat for 1 hr. The flask and contents were cooled with air to 40° C. and the contents were dewatered by centrifuging. The polymers were dried in either an oven at 40° C. or in a fluidised bed dryer.

This basic suspension polymerisation method was varied to terminate the polymerisation before complete conversion to provide polymerisable polymers as described in the examples below.

Preparation of Polymers by Solution Polymerisation

Polymers were made by solution polymerisation by dissolving MMA in toluene (33% w/w), adding the chosen concentration of polyfunctional monomer (MFM) and chain transfer agent (CTA) and initiating polymerisation using AIBN (1% by weight based on monomer). Polymerisations were performed at 80° C. in an oil bath under nitrogen using a condenser. Polymerisations were terminated by cooling and by adding inhibitor as described below.

Characterisation by GPC

The molecular weight was measured by Gel Permeation Chromatography using mixed gel columns and narrow molecular weight PMMA standards for calibration. Chloroform was used as the mobile phase with a flow rate of 1 ml/min and an infra-red detector. The weight average molecular weight (Mw), the number average molecular weight (Mn) and the polydispersity (Mw/Mn) were determined.

Determination of Solution Viscosities

The viscosity of a 30% (w/w) solution of the polymer in toluene was measured using a Brookfield Viscometer at a temperature of 25° C. using an LV2 spindle.

MMA is methyl methacrylate
BMA is n-butyl methacrylate
EMA is ethyl methacrylate
MAA is methacrylic acid
TPGDA is tripropylene glycol diacrylate
TMPTA is trimethylol propane triacrylate
PETA is pentaerythritol tetraacrylate
DPEHA is dipentaerythritol hexaacrylate
EGDMA is ethylene glycol dimethacrylate
TRIMP is trimethylol propane tris(3-mercaptopropionate)
PETMP is pentaerythritol tetramercaptopropionate
DPEHTG is dipentaerythritol hexathioglycollate
DDM is dodecyl mercaptan

EXAMPLES 1–5

Polymers were made by the suspension polymerisation of MMA and TPGDA in the presence of DDM.

A polymerisation time of 43 minutes at 90° C. was established to obtain 99% conversion of monomer. Polymers with pendant acrylate groups were obtained by adding inhibitor at shorter polymerisation times. This was achieved by adding a 2% aqueous solution of hydroquinone, equivalent to 0.05% hydroquinone on monofunctional monomer. The samples were immediately cooled with air for 10 minutes to 40° C. The resulting polymers were subsequently analysed by NMR spectroscopy and the % of pendant acrylate groups was calculated. Molecular weights were determined by GPC. The acrylate % is the number of unreacted pendant acrylates as a fraction of the total of acrylate groups in the TPGDA incorporated.

TABLE 1

| Example | TPGDA wt % | DDM wt % | MeHQ time (min) | conversn % | acrylate % | Mn (g/mole) | Mw (g/mole) |
|---|---|---|---|---|---|---|---|
| 1 (comparative) | 3 | 4 | none | 99 | — | 6,900 | 43,000 |
| 2 | 3 | 4 | 40 | 97 | 21 | 6,450 | 34,500 |
| 3 | 3 | 4 | 38 | 96.3 | 24 | 5,800 | 32,000 |
| 4 | 3 | 4 | 33 | 92.3 | 44 | 5,050 | 18,850 |
| 5 | 3 | 4 | 30 | 94.1 | 59 | 5,100 | 15,950 |

EXAMPLES 6–21

Use of Acrylate-functionalised Polymers in Clear Varnishes

Acrylate-functionalised polymers were made by solution polymerisation, stopping the polymerisation by removing the polymerisation from the water bath followed by the addition of 0.05%w based on polymer of Topanol-A™ (Great Lakes Chemicals) inhibitor, resulting in approximately 85–90% conversion of monomer to polymer. All polymerisations were based on MMA as monofunctional monomer and the polyfunctional monomer shown in Tables 2 & 3. A linear control polymer (Example 13) was made by polymerising MMA in the absence of polyfunctional monomer. All polymers were isolated by precipitation in hexane followed by drying in a vacuum oven at 50° C.

Clear varnish coating compositions were prepared using the acrylate-functionalised polymer, tripropylene glycol diacrylate as monomer and Ebecryl™ 605 (UCB Chemicals) epoxy acrylate oligomer or Ebecryl™ 4858 urethane-acrylate oligomer. Darocur™ 1173 (Ciba-Geigy) was used as photoinitiator with an amine synergist Ebecryl™ P115. The coating formulations were:

|  | wt % |
|---|---|
| Acrylate-functionalised polymer | 15 |
| TPGDA | 50 |
| oligomer | 25 |
| Darocur 1173 | 5 |
| Ebecryl P115 | 5 |

The formulations were coated on to paper substrates to a thickness of 12 μm. The coatings were then cured using a Primarc UV curing unit with a high-pressure mercury lamp light source at a power of 80 W.cm$^{-2}$. The optimum cure rate was assessed by establishing the maximum rate at which a surface tack-free film was obtained. The cured coatings were then tested for solvent resistance and gloss. Solvent resistance was determined in respect of methyl ethyl ketone (MEK). The cured coating was rubbed with a cloth saturated with MEK and the number of double rubs recorded at the failure of the coating. The results are shown in Tables 2 & 3 and demonstrate that the coatings containing acrylate-functionalised branched polymers have cure rates similar to or faster than the coating containing linear non-functionalised polymer and superior solvent resistance.

TABLE 2

Coatings containing Ebecryl 605 epoxy acrylate oligomer

|  | Polyfunctional monomer | | | | Chain transfer agent | | | | cure | solvent resistance |
|---|---|---|---|---|---|---|---|---|---|---|
|  | TPGDA wt % | TMPTA wt % | PETA wt % | DPEHA wt % | DDM wt % | TRIMP wt % | PETMP wt % | DPEHTG wt % | rate (m/min) | (double rubs) |
| 6 | 1.5 | — | — | — | 2 | — | — | — | 48 | 125 |
| 7 | — | 1.48- | — | — | 2 | — | — | — | 52 | 171 |
| 8 | — | — | 1.76 | — | 2 | — | — | — | 52 | 195 |
| 9 | — | — | — | 2.89 | 2 | — | — | — | 52 | 250 |
| 10 | — | 1.48 | — | — | — | 3.98 | — | — | 48 | 155 |
| 11 | — | — | 1.76 | — | — | — | 4.88 | — | 48 | 145 |
| 12 | — | — | — | 2.89 | — | — | — | 6.98 | 48 | 117 |
| 13 | — | — | — | — | 3.2 | — | — | — | 48 | 80 |

TABLE 3

Coatings containing Ebecryl 4858 urethane-acrylate oligomer

|  | Polyfunctional monomer | | | | Chain transfer agent | | | | cure |
|---|---|---|---|---|---|---|---|---|---|
|  | TPGDA wt % | TMPTA wt % | PETA wt % | DPEHA wt % | DDM wt % | TRIMP wt % | PETMP wt % | DPEHTG wt % | rate (m/min) |
| 14 | 1.5 | — | — | — | 2 | — | — | — | 39 |
| 15 | — | 1.48- | — | — | 2 | — | — | — | 39 |
| 16 | — | — | 1.76 | — | 2 | — | — | — | 39 |

TABLE 3-continued

Coatings containing Ebecryl 4858 urethane-acrylate oligomer

| | Polyfunctional monomer | | | | Chain transfer agent | | | cure |
|---|---|---|---|---|---|---|---|---|
| | TPGDA wt % | TMPTA wt % | PETA wt % | DPEHA wt % | DDM wt % | TRIMP wt % | PETMP wt % | DPEHTG wt % | rate (m/min) |
| 17 | — | — | — | 2.89 | 2 | — | — | — | 43 |
| 18 | — | 1.48 | — | — | — | 3.98 | — | — | 36 |
| 19 | — | — | 1.76 | — | — | — | 4.88 | — | 32 |
| 20 | — | — | — | 2.89 | — | — | — | 6.98 | 32 |
| 21 | — | — | — | — | 3.2 | — | — | — | 20 |

EXAMPLES 22–25

Polymers were made by suspension polymerisation in a similar fashion to examples 1–5. Molecular weights were determined by GPC. The polymers were dissolved in TPGDA monomer at 30% w/w and the resulting solution was mixed 50/50 with a UV-curing ink based on black pigment, epoxy acrylate oligomer, TPGDA monomer and photoinitiator. Inks were coated with wire bars to produce coat thicknesses of approximately 20 μm. Cure rate and solvent resistance were measured as described in Examples 6–21. Ink viscosity was measured by Brookfield viscometer at 25° C. Results and polymer compositions are shown in Table 4.

TABLE 4

| Example | MFM | TPGDA wt % | DDM wt % | viscosity (cP) | cure rate (m/min) | solvent resistance (double rubs) |
|---|---|---|---|---|---|---|
| 22 | MAA/nBMA/EMA (3:39:58) | 0 | 0.4 | 5,260 | <20 | 120 |
| 23 | MMA | 3 | 4 | 2,860 | 28 | >400 |
| 24 | MMA | 3 | 4 | 2,250 | 20 | >400 |
| 25 | MMA/BMA/MAA (95.5:3:1.5) | 3 | 4 | 2,650 | 20 | >400 |
| 26 | MMA/BMA/MAA (67.5:31:1.5) | 3.5 | 4 | 3,290 | 20 | >400 |

EXAMPLE 26

Fast Initiator

Polymers were made by the suspension polymerisation of MMA and 3% wt TPGDA in the presence of 4% wt DDM as described in the general method but using an equimolar quantity of Vazo 52 in place of AIBN. No inhibitor was added to the polymerisation. Vazo 52 is a commercially available free-radical initiator based on 2,2640 -azobis(2, 4dimethylvaleronitrile). The resulting polymer had Mn=6, 600 g/mole, Mw=30,050 g/mole, the residual monomer was 4%, and the polymer contained unreacted acrylate groups. cl EXAMPLE 27

Bulk Polymerisation

MMA, 3% TPGDA, 4% DDM and 0.5% lauroyl peroxide are weighed out and transferred to a nylon bag, which is sealed ensuring no air bubbles are present. This is then placed in an oven with a programmed temperature cycle running from 55° C. to 120° C. over 40 hours in a step-wise pattern. The resulting polymer had residual MMA of 13%w/w, Mn=7,050 and Mw=42,700 and contained residual acrylate functionality.

What is claimed is:
1. A method of preparing a polymer which includes at least one polymerisable double bond which comprises:
   (i) mixing together a monofunctional monomer having one polymerisable double bond per molecule with 0.3–100% w/w (of the weight of the monofunctional monomer) of a polyfunctional monomer having ea least two polymerisable double bonds per molecule and from 0.0001–50% w/w (of the weight of the monofunctional monomer) of a chain transfer agent and optionally a free-radical polymerisation initiator, said monofunctional monomer comprising at least one of methyl (meth)acrylate, n-butyl (meth)acrylate, iso-butyl (meth)acrylate, t-butyl (meth)acrylate or methacrylic acid and said polyfunctional monomer comprising at least one of bi-functional (meth)acrylates, tri-functional (meth)acrylates, tetra-functional (meth) acrylates, penta-functional (meth)acrylates, hexa-functional (meth)acrylates, oligomers or polymers having at least two polymerisable (meth)acrylate groups per molecule, and mixtures thereof
   (ii) reacting said mixture to form a polymer, and
   (iii) terminating the polymerisation reaction when 80 to 98% of the polymerisable double bonds present in the mixture have reacted to form polymer.
2. A method as claimed in claim 1, wherein the monofunctional monomer comprises a mixture of more than one monofunctional monomer.
3. A method as claimed in claim 1, wherein the polyfunctional monomer comprises at least one of ethylene glycol di(meth)acrylate, hexanediol di(meth)acrylate, tripropylene glycol di(meth)acrylate, butanediol di(meth)acrylate, neopentyl glycol di(meth)acrylate, diethylene glycol di(meth) acrylate, triethylene glycol di(meth)acrylate, dipropylene glycol di(meth)acrylate, allyl (meth)acrylate and substituted analogs thereof.
4. A method as claimed in claim 1, wherein the chain transfer agent is selected from monofunctional and polyfunctional thiols.

5. A method as claimed in claim 1, wherein the reaction is terminated by the addition of a polymerisation inhibitor to the reaction mixture and/or by cooling the reaction mixture.

6. A method as claimed in claim 1, wherein the polymerisation reaction is initiated using a combination of initiator type, initiator concentration, polymerisation temperature and polymerisation time such that the availability of free radicals to initiate polymerisation is insufficient to convert all polymerisable groups in the monomer mixture to polymer.

7. A method as claimed in claim 6, wherein the polymerisation is carried out at a temperature in the range 70–80° C. using an initiator which has a 10-hour half-life temperature of less than 64° C.

8. A method as claimed in claim 7, wherein the initiator is selected from 2,2'-azobis(2,4-dimethylvaleronitrile) and t-butylperoxyneodecanoate.

9. A method as claimed in claim 1, wherein the polymerisation reaction is terminated when 85%–97% of the polymerisable double bonds present in the mixture have reacted to form polymer.

10. A method of preparing a polymer which includes at least one polymerisable double bond which comprises:
   (i) mixing together a monofunctional monomer having one polymerisable double bond per molecule with 0.3–100% w/w (of the weight of the monofunctional monomer) of a polyfunctional monomer having at least two polymerisable double bonds per molecule and from 0.0001–50% w/w (of the weight of the monofunctional monomer) of a chain transfer agent and optionally a free-radical polymerisation initiator, said monofunctional monomer comprising at least one of methyl (meth)acrylate, n-butyl (meth)acrylate, iso-butyl (meth)acrylate, t-butyl (meth)acrylate or methacrylic acid and said polyfunctional monomer comprising at least one of bi-functional (meth)acrylates, tri-functional (meth)acrylates, tetra-functional (meth)acrylates, penta-functional (meth)acrylates, hexa-functional (meth)acrylates, oligomers or polymers having at least two polymerisable (meth)acrylate groups per molecule, and mixtures thereof
   (ii) reacting said mixture to form a polymer, and
   (iii) adding polymerisation inhibitor to the reaction mixture to terminate the polymerisation reaction when 80 to 98% of the polymerisable double bonds present in the mixture have reacted to form polymer.

11. A method as claimed in claim 10, wherein the polymerisation inhibitor is added to the reaction mixture to terminate the polymerisation reaction when 85%–97% of the polymerisable double bonds present in the mixture have reacted to form polymer.

12. A method of preparing a polymer which includes at least one polymerisable double bond which comprises:
   (i) mixing together a monofunctional monomer having one polymerisable double bond per molecule with 0.3–100% w/w (of the weight of the monofunctional monomer) of a polyfunctional monomer having at least two polymerisable double bonds per molecule and from 0.0001–50% w/w (of the weight of the monofunctional monomer) of a chain transfer agent and optionally a free-radical polymerisation initiator, said monofunctional monomer comprising at least one of methyl (meth)acrylate, n-butyl (meth)acrylate, iso-butyl (meth)acrylate, t-butyl (meth)acrylate or methacrylic acid and said polyfunctional monomer comprising at least one of bi-functional (meth)acrylates, tri-functional (meth)acrylates, tetra-functional (meth)acrylates, penta-functional (meth)acrylates, hexa-functional (meth)acrylates, oligomers or polymers having at least two polymerisable (meth)acrylate groups per molecule, and mixtures thereof
   (ii) reacting said mixture to form a polymer, and
   (iii) cooling the reaction mixture to terminate the polymerisation reaction when 80 to 98% of the polymerisable double bonds present in the mixture have reacted to form polymer.

13. A method as claimed in claim 12, wherein the reaction mixture is cooled to terminate the polymerisation reaction when 85%–97% of the polymerisable double bonds present in the mixture have reacted to form polymer.

14. A method as claimed in claim 3, further comprising isolating the resulting polymer having acrylate functionality and formulating the isolated polymer into a curable composition.

15. A method of preparing a polymer which includes at least one polymerisable double bond which comprises:
   (i) mixing together a monofunctional monomer having one polymerisable double bond per molecule with 0.3–100% w/w (of the weight of the monofunctional monomer) of a polyfunctional monomer having at least two polymerisable double bonds per molecule and from 0.0001–50% w/w (of the weight of the monofunctional monomer) of a chain transfer agent and a free-radical polymerisation initiator, said monofunctional monomer comprising at least one of methyl (meth)acrylate, n-butyl (meth)acrylate, iso-butyl (meth)acrylate, t-butyl (meth)acrylate or methacrylic acid and said polyfunctional monomer comprising at least one of bi-functional (meth)acrylates, tri-functional (meth)acrylates, tetra-functional (meth)acrylates, penta-functional (meth)acrylates, hexa-functional (meth)acrylates, oligomers or polymers having at least two polymerisable (meth)acrylate groups per molecule, and mixtures thereof and
   (ii) reacting said mixture to form a polymer, and
      wherein the type and concentration of the polymerisation initiator, polymerisation temperature and polymerisation time are selected such that the availability of free radicals to initiate polymerisation is insufficient to convert all polymerisable groups in the monomer mixture to polymer, whereby the polymerisation reaction is terminated when 80 to 98% of the polymerisable double bonds present in the mixture have reacted to form polymer.

16. A method as claimed in claim 15, wherein the type and concentration of the polymerisation initiator, polymerisation temperature and polymerisation time are selected such that the availability of free radicals to initiate polymerisation is insufficient to convert all polymerisable groups in the monomer mixture to polymer, whereby the polymerisation reaction is terminated when 85 to 97% of the polymerisable double bonds present in the mixture have reacted to form polymer.

17. A method as claimed in claim 1, wherein the polyfunctional monomer comprises at least one of tripropylene glycol tri(meth)acrylate, trimethylol propane tri(meth)acrylate and pentaerythritol tri(meth)acrylate.

18. A method as set forth in claim 1, wherein the polyfunctional monomer comprises at least pentaerythritol tetra (meth)acrylate.

19. A method as set forth in claim 1, wherein the polyfunctional monomer comprises at least dipentaerythritol hexa(meth)acrylate.

* * * * *

UNITED STATES PATENT AND TRADEMARK OFFICE
CERTIFICATE OF CORRECTION

PATENT NO. : 6,713,584 B1
DATED : March 30, 2004
INVENTOR(S) : Chisholm et al.

It is certified that error appears in the above-identified patent and that said Letters Patent is hereby corrected as shown below:

Column 1,
Line 54, please delete "process" and insert -- processes --

Column 2,
Line 58, please delete "("

Column 3,
Line 30, please delete "polymersiable" and insert -- polymerisable --

Column 4,
Line 51, please delete "thios" and insert -- thiols --

Column 6,
Line 40, please delete "polyacrytic" and insert -- polyacrylic --

Column 7,
Line 30, please delete "polymensation" and insert -- polymerisation --

Column 14,
Line 22, please delete "having ae least two…." and insert -- having at least two… --

Signed and Sealed this

Twenty-first Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,713,584 B1 Page 1 of 1
APPLICATION NO. : 09/623860
DATED : March 30, 2004
INVENTOR(S) : Chisholm et al.

It is certified that error appears in the above-identified patent and that said Letters Patent is hereby corrected as shown below:

Column 1,
Line 54, delete "process" and insert -- processes --.

Column 2,
Line 58, delete "(".

Column 3,
Line 30, delete "polymersiable" and insert -- polymerisable --.

Column 4,
Line 51, delete "thios" and insert -- thiols --.

Column 6,
Line 40, delete "polyacrytic" and insert -- polyacrylic --.

Column 7,
Line 30, delete "polymensation" and insert -- polymerisation --.

Column 14,
Line 22, delete "having ae least two…." and insert -- having at least two… --.

Signed and Sealed this

Eleventh Day of July, 2006

JON W. DUDAS
*Director of the United States Patent and Trademark Office*